(12) United States Patent
Kumar N

(10) Patent No.: US 10,817,272 B2
(45) Date of Patent: Oct. 27, 2020

(54) GENERATION AND USAGE OF LANGUAGE-CONVERTED SCRIPT

(71) Applicant: SAP SE, Walldorf (DE)

(72) Inventor: Pradeep Kumar N, Bangalore (IN)

(73) Assignee: SAP SE, Walldorf (DE)

( * ) Notice: Subject to any disclaimer, the term of this patent is extended or adjusted under 35 U.S.C. 154(b) by 47 days.

(21) Appl. No.: 15/375,851

(22) Filed: Dec. 12, 2016

(65) Prior Publication Data

US 2018/0165068 A1    Jun. 14, 2018

(51) Int. Cl.
*G06F 8/51* (2018.01)
*G06F 8/41* (2018.01)

(52) U.S. Cl.
CPC .............. *G06F 8/51* (2013.01); *G06F 8/437* (2013.01)

(58) Field of Classification Search
CPC ........................................................ G06F 8/31
USPC ........................................................ 717/106
See application file for complete search history.

(56) References Cited

U.S. PATENT DOCUMENTS

| | | | |
|---|---|---|---|
| 6,578,054 B1 * | 6/2003 | Hopmann | G06Q 10/107 707/625 |
| 7,865,870 B2 * | 1/2011 | Gunturi | G06F 8/33 717/106 |
| 9,317,682 B1 * | 4/2016 | Kopylov | G06F 21/53 |
| 2003/0233404 A1 * | 12/2003 | Hopkins | G06F 17/30861 709/203 |
| 2004/0226027 A1 * | 11/2004 | Winter | G06F 8/20 719/328 |
| 2004/0267712 A1 * | 12/2004 | Papanyan | G06F 17/30902 |
| 2006/0234548 A1 * | 10/2006 | Qing | G06F 9/45508 439/587 |
| 2007/0055978 A1 * | 3/2007 | Meijer | G06F 9/449 719/331 |
| 2008/0086540 A1 * | 4/2008 | Scott | H04L 67/2861 709/217 |
| 2008/0104195 A1 * | 5/2008 | Hawkins | G06F 17/30902 709/217 |
| 2008/0147671 A1 * | 6/2008 | Simon | G06F 17/30899 |
| 2008/0301221 A1 * | 12/2008 | Arvidsson | G06F 9/541 709/203 |
| 2009/0024986 A1 * | 1/2009 | Meijer | G06F 8/41 717/137 |
| 2009/0122062 A1 * | 5/2009 | Kilpatrick | G06F 8/51 345/426 |
| 2009/0259744 A1 * | 10/2009 | Kolke | G06F 9/52 709/224 |

(Continued)

OTHER PUBLICATIONS

Aho, Sethi, and Ullman, "Compilers: Principles, Techniques, and Tools", 1986, Addison-Wesley, ISBN 0-201-10088-6, Chapter 1.*

*Primary Examiner* — James D. Rutten
(74) *Attorney, Agent, or Firm* — Buckley, Maschoff & Talwalkar LLC

(57) ABSTRACT

A system includes reception of a first script conforming to a first programming language, identification of a first declaration of a first variable in the first script, determination of a first datatype based on the first declaration, determination of a first initial value corresponding to the first datatype based on a second programming language, and generation of a first portion of a second script conforming to the second programming language, the first portion of the second script to initialize the first variable with the first initial value.

16 Claims, 14 Drawing Sheets

(56) References Cited

U.S. PATENT DOCUMENTS

| | | | |
|---|---|---|---|
| 2010/0070566 A1* | 3/2010 | Vandewalle | G06F 17/30861 709/203 |
| 2012/0030661 A1* | 2/2012 | Porras | G06F 9/45525 717/153 |
| 2012/0204160 A1* | 8/2012 | Ben-Artzi | G06F 8/51 717/137 |
| 2014/0067750 A1* | 3/2014 | Ranganathan | G06F 16/283 707/602 |
| 2014/0282374 A1* | 9/2014 | Fletcher | G06F 8/43 717/106 |
| 2014/0330791 A1* | 11/2014 | Bomhardt | G06F 17/30371 707/687 |
| 2015/0242194 A1* | 8/2015 | Vargas | G06F 8/51 717/137 |

* cited by examiner

GENERATION AND USAGE OF LANGUAGE-CONVERTED SCRIPT

BACKGROUND

Enterprise software systems receive, generate, and store data related to many aspects of an enterprise. Users may operate desktop and mobile clients to access such data. For example, a Web browser may communicate with a backend enterprise system via the Internet in order to access business applications executing thereon.

Conventional business applications are written in a backend-compatible language. Developers may modify such business applications using backend-compatible tools. Because the business applications simply send UI data for rendering to the clients, modifications to the business applications are reflected on the clients without requiring client-side application development.

Mobile client-side applications may provide access to locally-synchronized enterprise data while in an offline mode (i.e., not connected to the backend system). Modifications to business applications written in a backend-compatible language are typically incompatible with the mobile client-side application. Accordingly, substantial additional development effort is required in order to implement similar modifications in the mobile client-side application for use in an offline mode.

DETAILED DESCRIPTION

The following description is provided to enable any person in the art to make and use the described embodiments. Various modifications, however, will remain readily apparent to those in the art.

Briefly, according to some embodiments, a developer customizes an application using a backend scripting language. Corresponding offline scripts in an offline scripting language are automatically generated and synchronized with a mobile client for use in an offline mode. Accordingly, some embodiments provide efficient application development for heterogeneous offline and online architectures.

Figure 1:
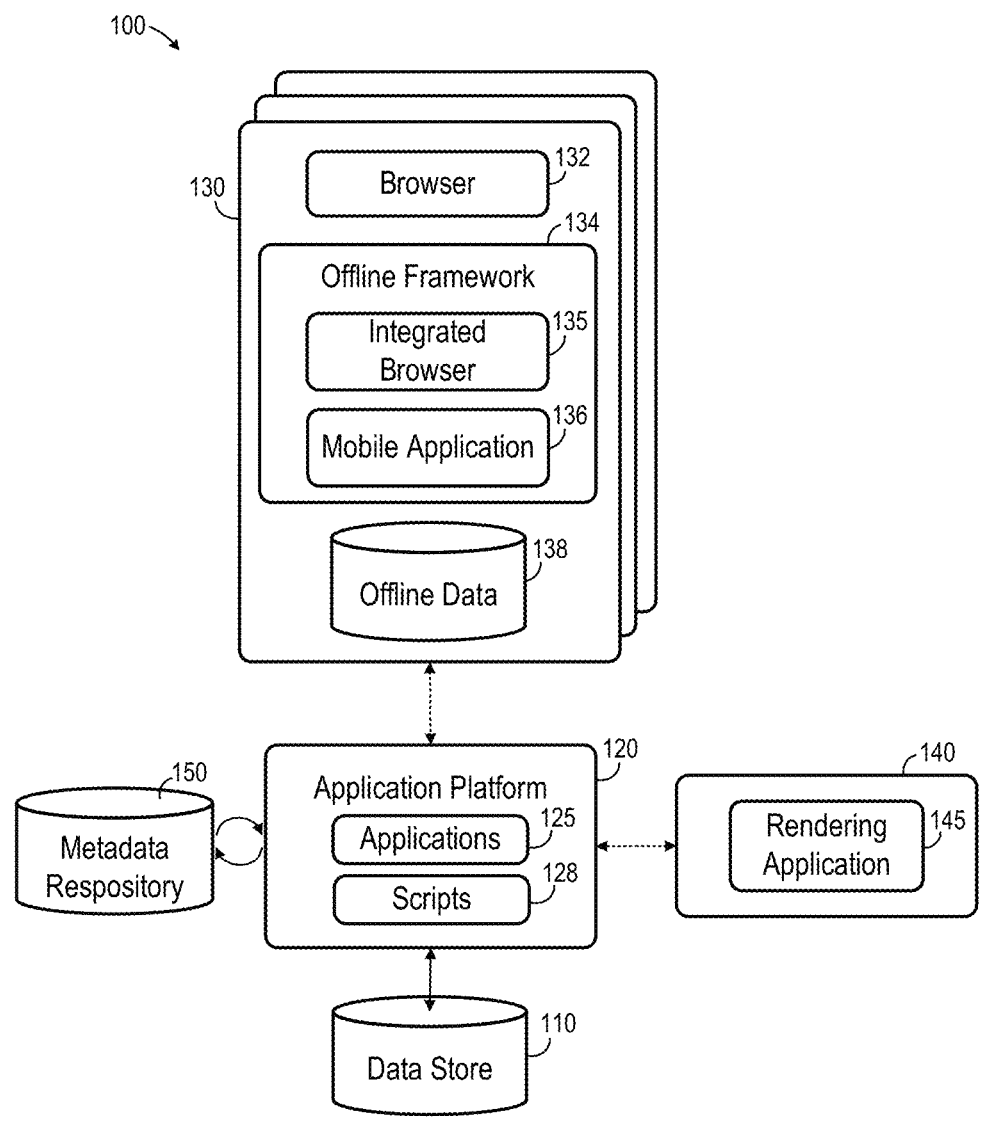
FIG. 1 is a block diagram of a system architecture according to some embodiments.

FIG. 1 is a block diagram of architecture 100 according to some embodiments. Embodiments are not limited to architecture 100 or to a database architecture. Architecture 100 includes data store 110, application platform 120, clients 130, developer system 140 and metadata repository 150. Generally, applications 125 executing within application platform 120 receive requests from browser 132 executing on a client 130 and, in response, provide renderable data to browser 132 based on data stored within data store 110.

Applications 125 (e.g., compiled code) and scripts 128 may comprise server-side executable program code conforming to a backend server-compatible language (e.g., ABAP, ABAP scripting language, etc.). According to some embodiments, an application 125 and its corresponding scripts 128 are executed to provide user interfaces to clients 130, receive requests via such user interfaces from clients 130, retrieve data from data store 110 based on the requests, process the data received from data store 110, and providing user interfaces including the processed data to clients 130.

Application platform 120 provides any suitable protocol interfaces through which browser 132 executing on a client 130 may communicate with applications 125 executing on application platform 120. For example, platform 120 may include a HyperText Transfer Protocol (HTTP) interface supporting a transient request/response protocol over Transmission Control Protocol (TCP), and/or a WebSocket interface supporting non-transient full-duplex communications between platform 120 and any clients 130 which implement the WebSocket protocol over a single TCP connection. One or more services executing on platform 120 may communicate with data store 110 using database management interfaces such as, but not limited to, Open Database Connectivity (ODBC) and Java Database Connectivity (JDBC) interfaces.

Application platform 120 may be separated from or closely integrated with data store 110. Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Metadata repository 150 may store metadata defining the logical entities (e.g., relational database tables and their respective interrelating schemas) of data store 110. Metadata repository 150 may also store metadata defining objects which are mapped to logical entities of data store 110. Each object associates may one or more physical entities (e.g., a physical database table, associated columns of one or more database tables, etc.) of one or more enterprise data sources with user-friendly names. These objects may be classified as dimensions, along which one may want to perform an analysis or report (e.g., Year, Country, Product) or measures (e.g., Sales, Profit), whose values can be determined for a given combination of dimension values.

Development system 140 may comprise any computing system operable by a developer to modify applications 125, scripts 128 and/or metadata of metadata repository 150. According to some embodiments, a developer operates development system 140 to execute rendering application 145, which may comprise a standard Web browser or other UI rendering application in some embodiments. Rendering application 145 interacts with a design-time application 125 (e.g., a design studio application) of application platform 120 which provides development functions. For example, rendering application 145 may interact with the design-time application 125 to allow the developer to view and modify (i.e., create, edit or delete) metadata of metadata repository 150 (e.g., to define a new column of a database table of data store 110) and to view and modify one or more of scripts 128 (e.g., to populate the new column). According to some embodiments, rendering application 145 receive UI metadata from the design-time application 125 and renders the metadata as native controls.

As will be described in detail below, a developer may operate rendering application 145 to create a script 128 conforming to a backend scripting language. Accordingly, in a case that a client 130 executes Web browser 132 to access an application 125 associated with the created script 128, the script 128 may be executed by application platform 120 to provide associated functionality to the client 130.

According to some embodiments, and as will also be described in detail below, the design-time application 125 may automatically generate an offline script which corresponds to the above-mentioned script 128 and conforms to an "offline" scripting language suitable for offline execution. According to some embodiments, the offline scripting language is Javascript, but embodiments are not limited thereto. The offline script may be stored in data store 110 and synchronized to a client 130 for later execution thereby.

Each of clients 130 may comprise one or more devices executing program code of Web browser 132 to allow interaction with applications 125 of application platform 120. In response, applications 125 may provide user interfaces to Web browser 132 (e.g., as HTML pages, as UI metadata describing controls conforming to a UI framework, etc.) based on the data of data store 110. Web browser 132 renders the user interfaces, which may be used for reporting, data analysis, and/or any other functions.

Figure 2:
FIG. 2 is an outward view of an online user interface according to some embodiments.

FIG. 2 illustrates UI 200 rendered by Web browser 132 in an online mode according to some embodiments. UI 200 includes data of data store 110, as well as UI controls rendered based on UI metadata received from an application 125 executing within application platform 120. UI 200 may reflect developer-generated modifications to the application 125. For example, the highlighted field "CustName" may be added to the "Products" object by modifying the metadata of metadata repository 150, and this field may be populated by executing scripts written by a developer in a backend-compatible language within application platform 120.

Clients 130 each include offline framework 134 to facilitate access to the data of data store 110 even if the client 130 is not in communication with application platform 120 (i.e., offline). In this regard, offline data 138 includes a synchronized copy of a portion of the data of data store 110. Offline data 138 may also store an offline script which was automatically generated as described above and copied to offline data 138 during a synchronization process as also described above.

Offline framework 134 may comprise a native container for executing client side coding. A different native container may be implemented for each of a variety of platforms (e.g., iOS, Android, Windows 8, Blackberry, etc.), thereby providing a platform-independent runtime environment for the client side coding. In this regard, offline data 138 may be exposed as a container plugin and abstracted by a JavaScript-based persistence API.

Offline framework 134 comprises integrated browser 135 and mobile application 136. Integrated browser 135 executes within offline framework 134 to render UI framework controls and containers based on UI metadata received from mobile application 136 based on offline data 138. Mobile application 136 may include client-side coding (e.g., JavaScript) and execute within offline framework 134. As will be described below, scripts conforming to an offline language (e.g., JavaScript) may be stored in offline data and executed within offline framework 134 according to some embodiments.

Figure 3:
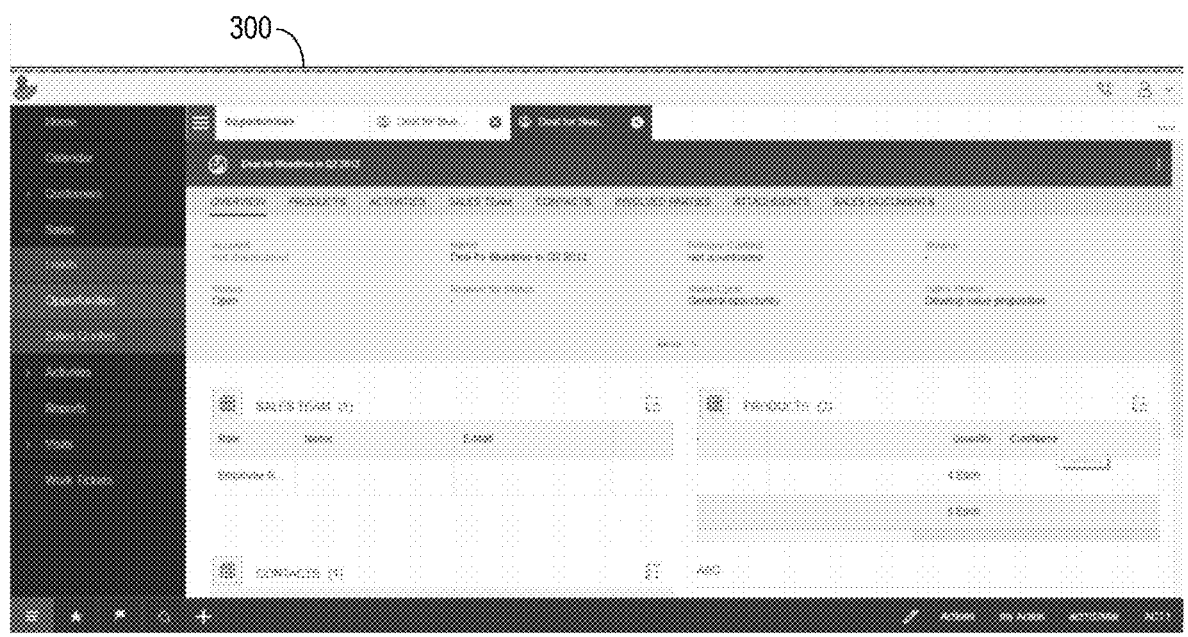
FIG. 3 is an outward view of an offline user interface according to some embodiments.

FIG. 3 illustrates UI 300 rendered by integrated browser 135 in an offline mode according to some embodiments. In some embodiments, integrated browser 135 operates in both online and offline modes and an independent Web browser is not required for online access. Accordingly, UI 300 of FIG. 3 is used in both online and offline modes.

It will be assumed for the present example that UI 300 reflects operation in an offline mode and therefore the data shown therein is based on the data of offline data 138. Moreover, the UI controls of UI 300 are rendered based on UI metadata received from mobile application 136 executing within offline framework 134.

Similarly to UI 200, UI 300 may reflect developer-generated modifications. However, the highlighted field "CustName" is added to the "Products" object via modification of metadata within offline data 130. This field is populated by executing, within offline framework 134, a corresponding script which conforms to a language of the offline framework (e.g., JavaScript) and is stored in offline data 138. As will be described below, the script may be generated automatically based on a script written by a developer in a backend-compatible language using a development application 125 and synchronized to offline data 138 during operation according to some embodiments.

Figure 4:
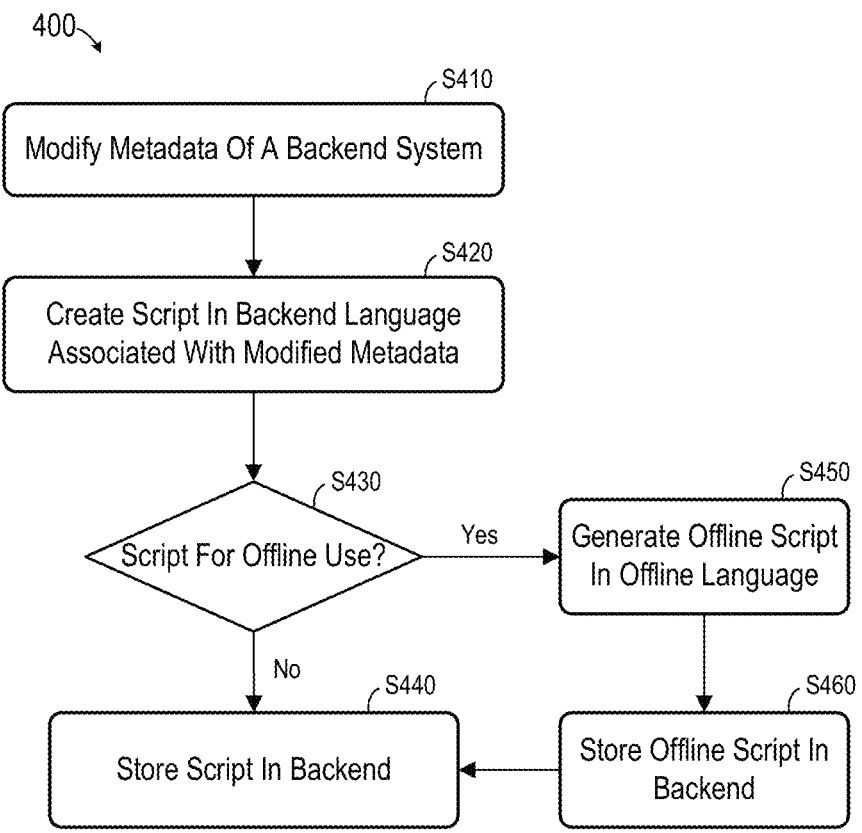
FIG. 4 comprises a flow diagram of a process according to some embodiments.

FIG. 4 comprises a flow diagram of process 400 according to some embodiments. Process 400 may be executed to automatically generated a script for offline use based on a backend-compatible script. In some embodiments, various hardware elements of system 100 execute program code to perform process 400.

Process 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 400 begins at S410 with modification of metadata of a backend system. The metadata may comprise metadata which defines attributes of a physical layer of a data store (e.g., database table columns), attributes of a logical layer of a data store (e.g., dimensions, dimension values and/or measures), and/or any other metadata which might be relevant to a backend application. The metadata may be modified according to any development paradigm that is or becomes known.

For example, as described above, a developer may operate rendering application 145 of development system 140 to access a development application 125 of application platform 120. The development application may provide user interfaces which allow a developer to view and/or modify metadata of metadata repository 140.

Figure 5:
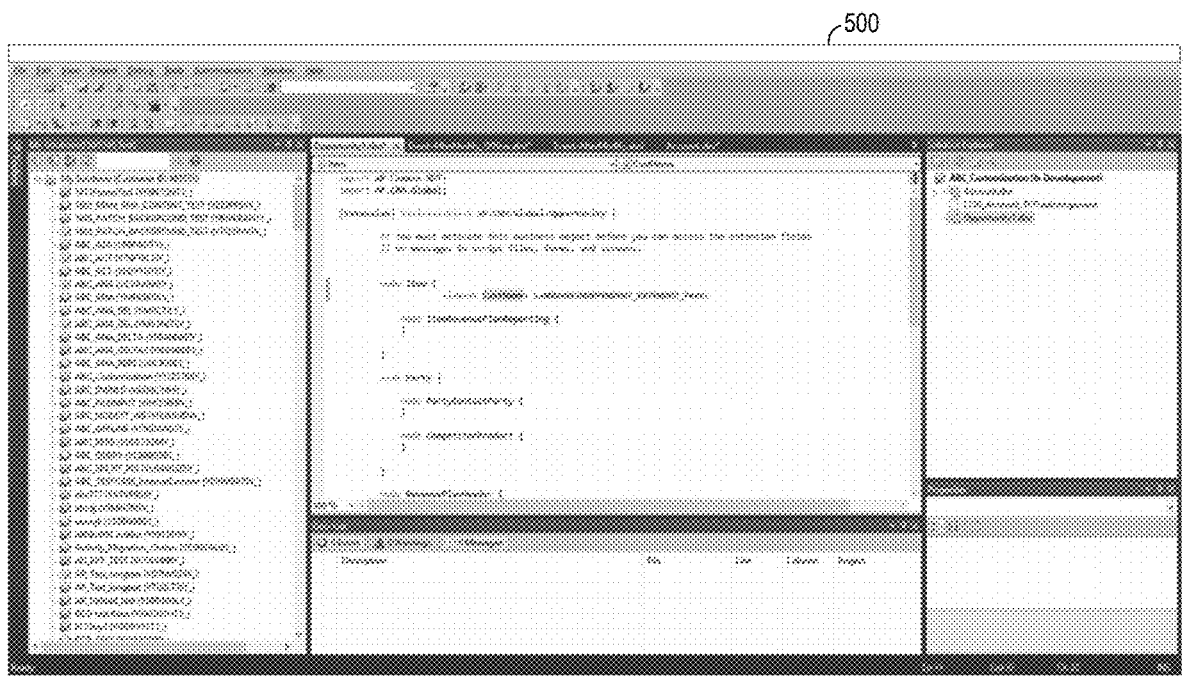
FIG. 5 is an outward view of a user interface for modifying metadata according to some embodiments.

FIG. 5 is a view of user interface 500 of a development application 125 according to some embodiments. A developer may interact with user interface 500 to create a new custom field "CustName" of the object Opportunity. The custom field is associated with a backend-language data type "LANGUAGEINDEPENDENT_EXTENDED_Text" defined in metadata repository 150. Creation of the custom field modifies corresponding metadata (e.g., metadata associated with the object Opportunity) of metadata repository 150.

Figure 6:
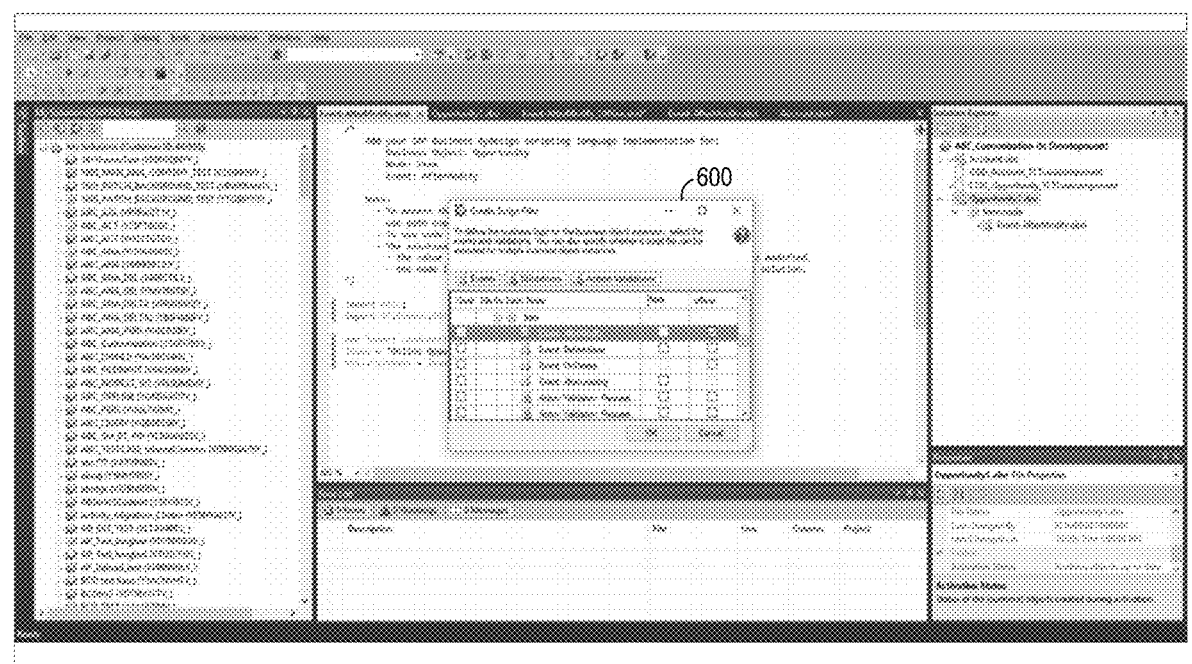
FIG. 6 is an outward view of a user interface for generating a script according to some embodiments.

At S420, a script associated with the modified metadata is created in a backend language. FIG. 6 illustrates user interface 600 of the development application 125 according to some embodiments. User interface 600 allows a developer to specify one or more events which will trigger execution of the script. According to the present example, and as illustrated in FIG. 6, the script is to be executed after modification of the object Opportunity and when operating in an offline mode.

Figure 7:
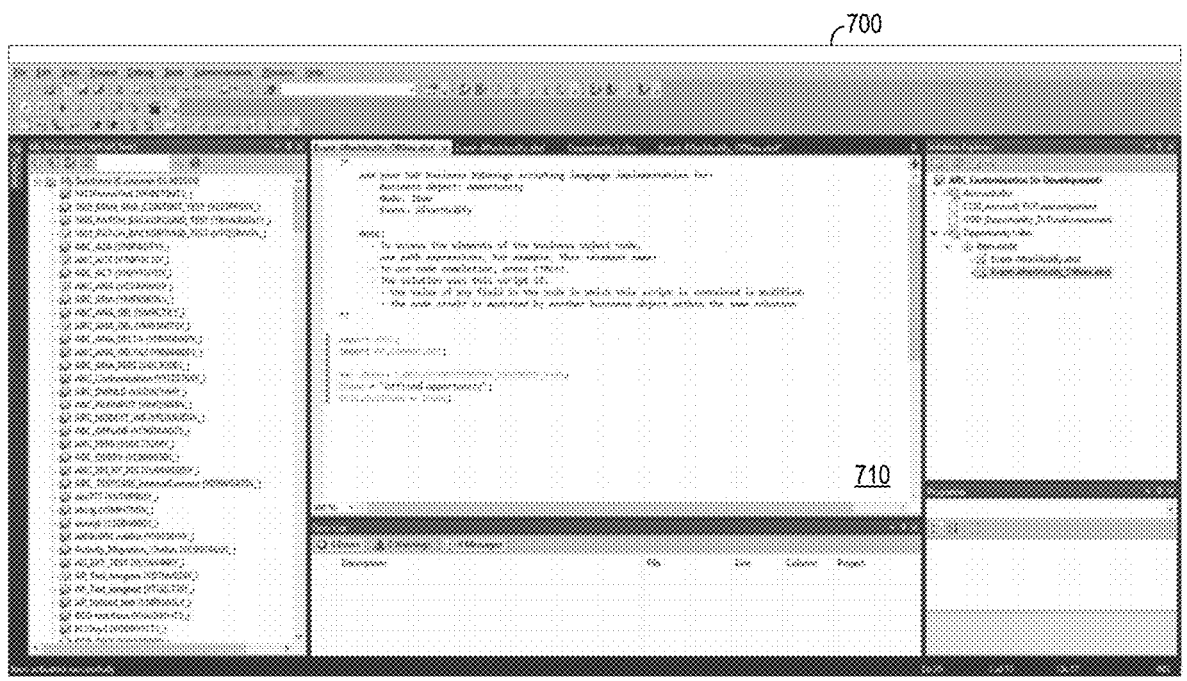
FIG. 7 is an outward view of a user interface for generating a script according to some embodiments.

After specifying the one or more events, coding of the script may proceed via user interface 700 of FIG. 7. As shown, a script is created in area 710, using backend-language (e.g., ABAP) code, to assign the value "Offline Opportunity" to the custom field "CustName". As described above, this value is assigned (i.e., the script is triggered) in response to offline modification of the object Opportunity. Although the present example includes creation of a script which corresponds to developer-modified metadata, embodiments are not limited thereto. That is, the script created at S420 may be unrelated to any developer-modified metadata.

Next, at S430, it is determined whether the script is intended for offline use. The determination at S430 may be triggered by an instruction from the developer to activate the script. This instruction may comprise selection of a UI button, a toolbar menu function, an "Activate" entry of a context menu which is displayed in response to right-clicking on the script, or by any other UI metaphor. The determination may be based on a flag set by the developer as shown in user interface 600, or based on any other suitable indication.

It will initially be assumed that the script created at S420 is not intended for offline use. Accordingly, the determination at S430 is negative and the script is stored in the backend (e.g., in application platform 120, in data store 110 and/or in metadata repository 150) at S430. Such a script is then executed by application platform 120 if the event associated with the script occurs. The stored script is written in a backend-compatible language and therefore may be executed by the backend system.

Flow proceeds from S430 to S450 if the script created at S420 is intended for offline use, as in the example above. At S450, an "offline" script is generated based on the script created at S420. The offline script is created in an offline-compatible language. For example, since offline framework 134 provides a JavaScript container for mobile application 136, the offline script created at S450 may conform to JavaScript.

Examples of generation of the offline script at S450 will be described in detail below with respect to FIG. 12. Briefly, according to some embodiments, the backend language in which the script was created supports the declaration of variable datatypes, but the offline language does not. Rather, in the offline language, a datatype of a variable is implicitly declared based on the initial value assigned to the variable. Accordingly, generation of the offline script at S450 includes generating code to assign initial values to each variable of the backend language script based on the datatype declarations for the variables in the backend language script.

Referring to specific example of FIG. 7, the backend-compatible script includes the following variable declaration:
var 1Name: LANGUAGEINDEPENDENT_EXTENDED_Text;

The ABAP type LANGUAGEINDEPENDENT_EXTENDED_Text is of the type string. According to the target offline language (i.e., JavaScript), variables of type string are assigned an initial value of empty string (i.e., ' '). Accordingly, the following script in the offline language is generated at S450:
this._oLName_2='';

The offline script is saved to the backend at S460. The offline script may be stored in application platform 120, in data store 110 and/or in metadata repository 150. As will be described below, the stored offline script is not executed by application platform 120, but is synchronized to offline data 138 for execution therefrom. Flow then proceeds to S440 to store the originally-created script as described above.

Figure 8:
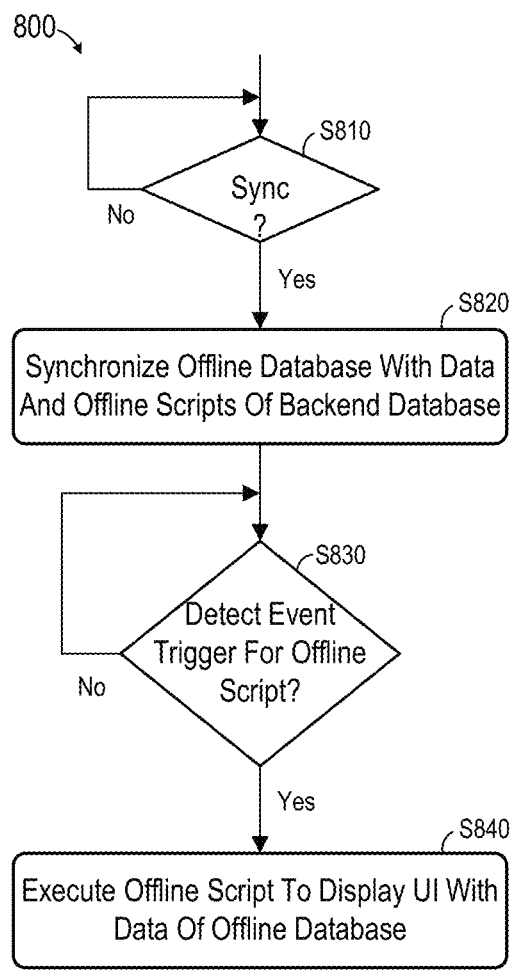
FIG. 8 comprises a flow diagram of a process according to some embodiments.
Figure 9:
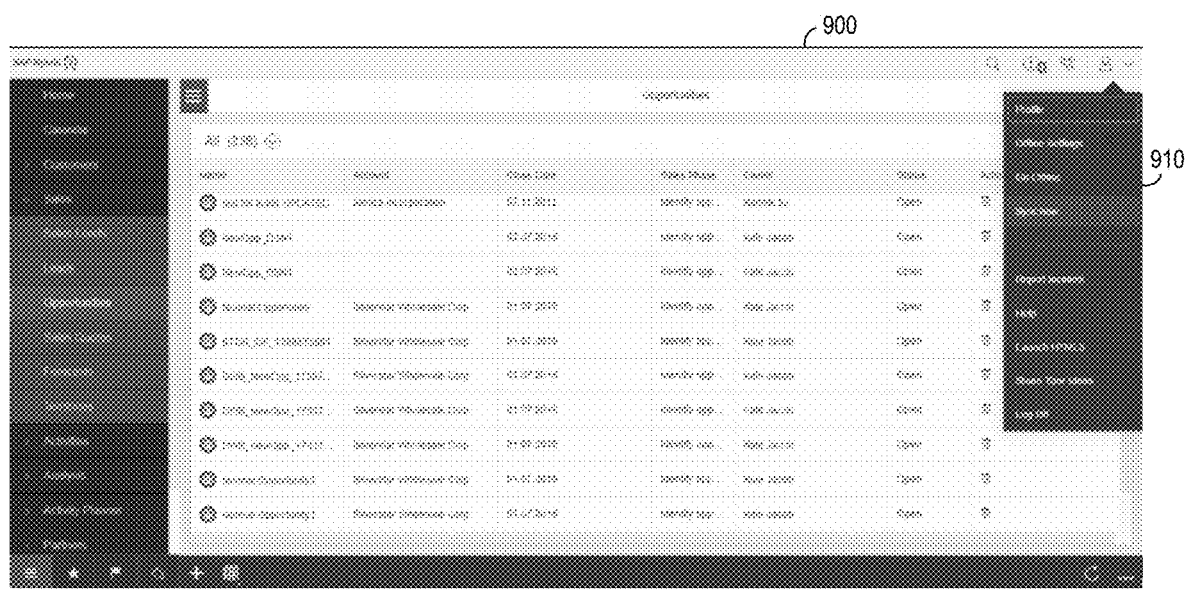
FIG. 9 is an outward view of an offline user interface according to some embodiments

Process 800 of FIG. 8 describes some embodiments of the aforementioned synchronization. Prior to process 800, a user may operate a client 140 to execute mobile application 136. Mobile application 136 executes within offline framework 134 and in conjunction with integrated browser 135 to display a user interface such as UI 900 of FIG. 9. The user may manipulate user interface 900 to view data stored in offline data 138.

Drop-down menu 910 includes a Sync now option. It will be assumed that the user selects this option, causing flow to proceed from S810 to S820. Offline data 138 is synchronized with data store 110 at S820. The synchronization of data may proceed according to user roles and synchronization settings as is known in the art. Synchronization at S820 also includes synchronization of metadata and of offline scripts stored in the backend. In the present example, S820 may include storage of the changed metadata describing the new CustName field and of the automatically-generated offline script in offline data 138.

Figure 10:
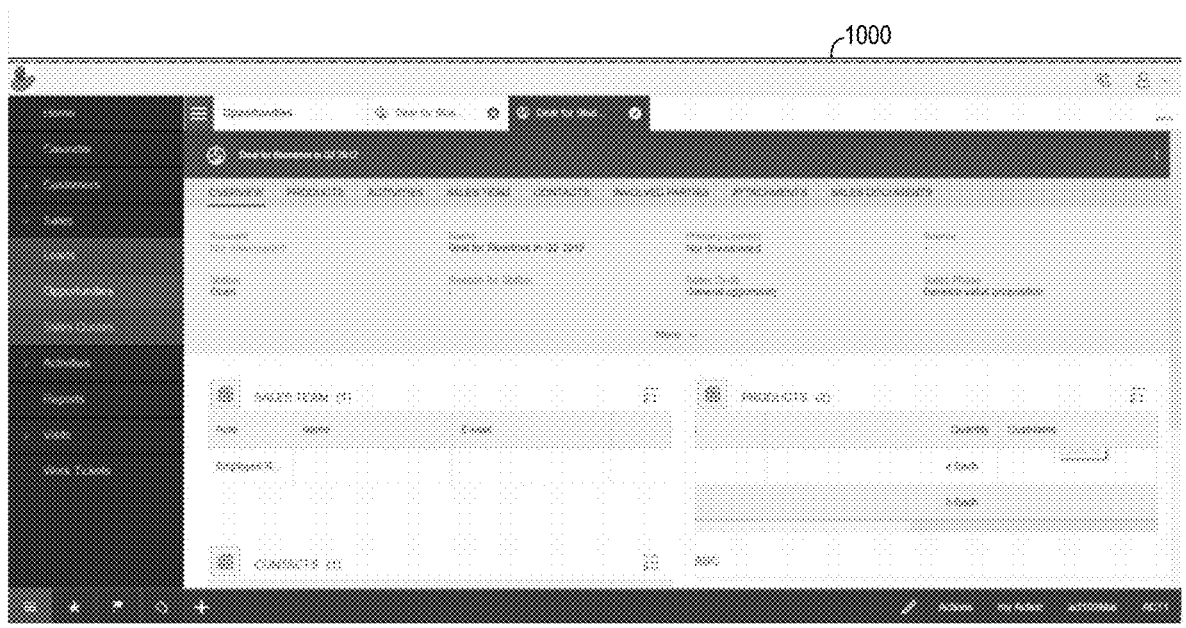
FIG. 10 is an outward view of an offline user interface according to some embodiments.

After synchronization at S820, the user may select an opportunity listed in UI 900 and be presented with UI 1000 of FIG. 10. UI 1000 shows fields and field values for the selected opportunity. UI 1000 shows the new field CustName, based on the synchronized metadata of offline data 138 which describes this new field.

Flow pauses at S830 until a trigger event associated with the synchronized offline script is detected. In the present example, the trigger event associated with the offline script is a modification of an Opportunity object. It will therefore be assumed that the user modifies the data of the displayed opportunity and, in response, flow proceeds to S840.

Figure 11:
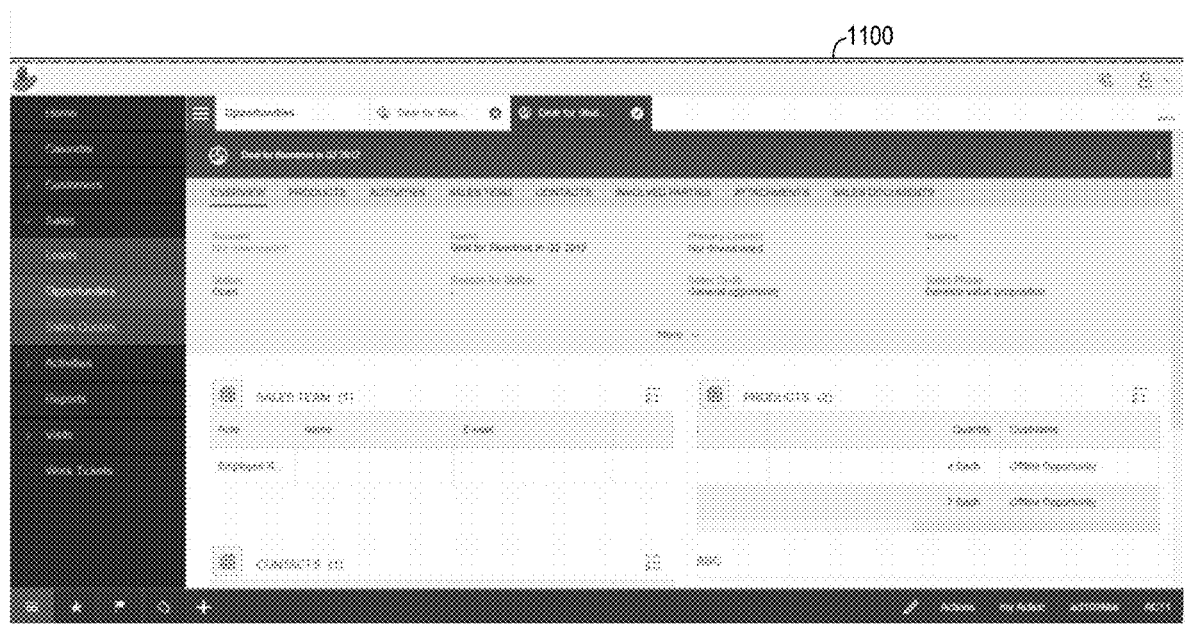
FIG. 11 is an outward view of an offline user interface according to some embodiments.

The offline script is executed at S840. The offline script is retrieved from offline data 138 for execution according to some embodiments. The offline script conforms to the offline language and may therefore be executed within offline framework 134. As shown in UI 1100 of FIG. 11, execution of the offline script causes population of the CustName field with the string value 'Offline Opportunity'.

Figure 12:
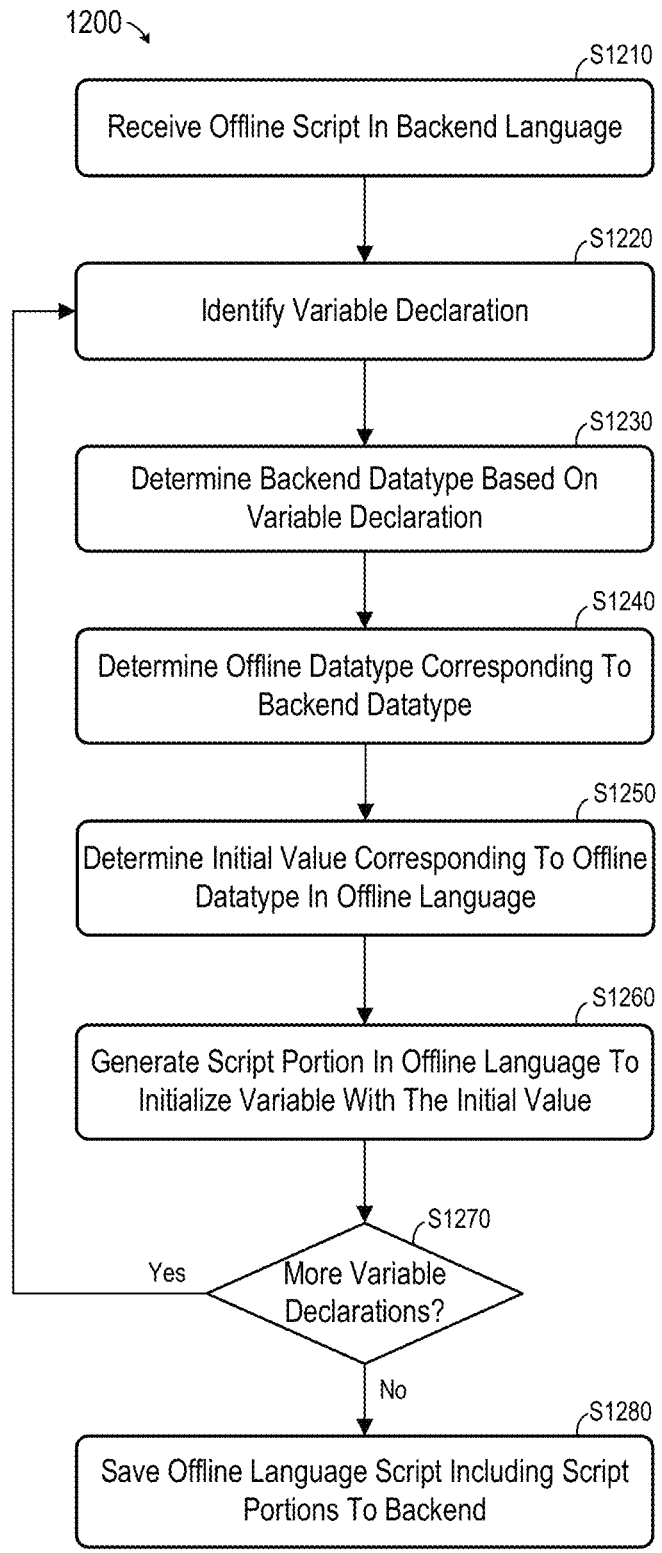
FIG. 12 comprises a flow diagram of a process according to some embodiments.

FIG. 12 is a detailed flow diagram of process 1200 to automatically generate an offline-compatible script based on a backend-compatible script according to some embodiments. Process 1200 may be executed at S450 of process 400, but embodiments are not limited thereto.

Initially, at S1210, an offline script (i.e., a script intended for offline execution) is received. The received offline script conforms to a backend language as described above. Next, at S1220, a variable declaration is identified in the offline script. Using the above example, the variable declaration "var 1Name: LANGUAGEINDEPENDENT_EXTENDED_Text;" is identified at S1220.

A backend datatype is determined at S1230 based on the variable declaration. In the above example, the backend datatype is ABAP datatype LANGUAGEINDEPENDENT_EXTENDED_Text. An offline datatype which corresponds to the backend datatype is then determined at S1240. Since the ABAP datatype LANGUAGEINDEPENDENT_EXTENDED_Text is a string datatype, therefore the offline (e.g., JavaScript) datatype is determined to be a string datatype at S1240. Metadata repository 150 may include metadata indicating the offline datatypes which correspond to various online datatypes. This metadata may also describe backend datatypes which are of structure type and their constituent backend datatypes, as will be described below.

Next, at S1250, an initial value corresponding to the offline datatype in the offline language is determined. As mentioned above, ' ' is the initial value with which a variable of string type is to be initialized in JavaScript, and is therefore determined as the initial value at S1250 according to the present example. In other examples, a numeric offline datatype corresponds to an initial value of 0 and a Boolean offline datatype corresponds to an initial value of false. According to some embodiments, the development application 125 which executes process 1200 includes logic associating JavaScript datatypes and corresponding initial values, and uses this logic to determine initial values at S1250.

A script portion conforming to the offline language is automatically generated at S1260. The script portion initializes the variable of the variable declaration with the initial value determined at S1250. Continuing the present example, the generated script portion may be: this._oLName_2="";

It is then determined at S1270 whether the offline script received at S1210 includes any more variable declarations. If so, flow returns to S1220 to identify a next variable declaration and proceeds as described above.

In some embodiments, the backend datatype determined at S1230 may comprise a structure comprising two or more other datatypes. For example, an offline script in a backend language may include the following variable declarations:
var amtcalc: Amount;
var aggr: Price;

It will be assumed that metadata repository 150 includes metadata indicating that the datatype Amount is a structure datatype comprising the backend datatypes content and currencyCode. Moreover, the backend datatypes content and currencyCode correspond to string and numeric datatypes, respectively. Accordingly, the following script may be generated at S1260 for the first of the two above-listed variable declarations:

```
this_oAmtcalc_2 = {
    currencyCode: ' ',
    content: 0
};
```

Regarding the second of the two above-listed variable declarations, it will be assumed that metadata repository 150 includes metadata indicating that the datatype Price is a structure datatype comprising the backend datatypes Amount, BaseQuantity and Base QuantityTypeCode, each of which is also a structure datatype. Accordingly, S1240 may comprise determining the offline datatype corresponding to each simple datatype within the nested structure of datatypes, and S1250 may comprise determining the initial value for each of the simple datatypes. The nested structure may then be mirrored in the generated script at S1260 as follows:

```
this_oAggr_3 = {
    Amount: {
        currencyCode: ' ',
        content: 0
    };
    BaseQuantity: {
        unitCode: ' ',
        content: 0
    };
    BaseQuantityTypeCode: {
        listID: ' ',
        listVersionID: ' ',
        listAgencyID: ' ',
        listAgencySchemeID: ' ',
        listAgencySchemeAgencyID: ' ',
        content: 0
    };
};
```

Figure 13:
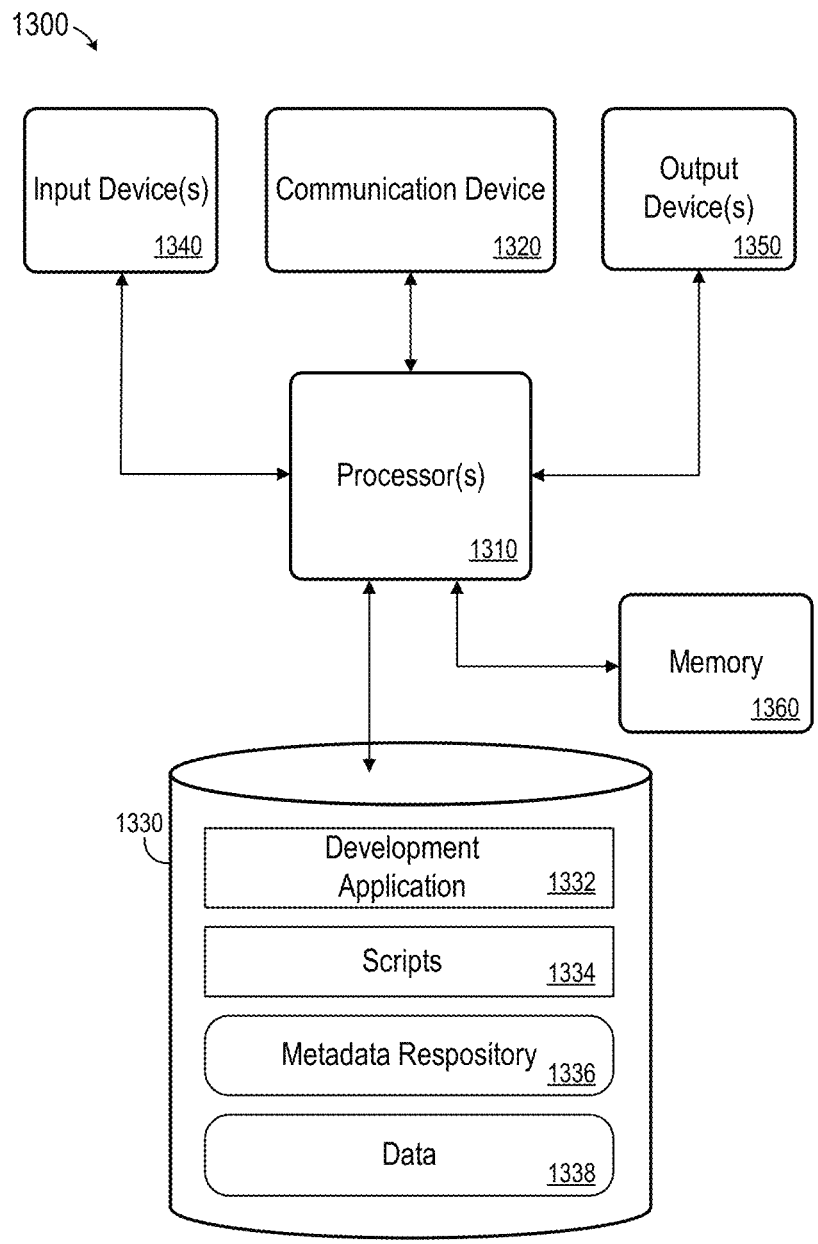
FIG. 13 is a block diagram of a backend system according to some embodiments.

FIG. 13 is a block diagram of apparatus 1300 according to some embodiments. Apparatus 1300 may comprise a general-purpose computing apparatus and may execute program code to perform any of the functions described herein. Apparatus 1300 may comprise an implementation of application platform 120 of FIG. 1 in some embodiments. Apparatus 1300 may include other unshown elements according to some embodiments.

Apparatus 1300 includes processor(s) 1310 operatively coupled to communication device 1320, data storage device 1330, one or more input devices 1340, one or more output devices 1350 and memory 1360. Communication device 1320 may facilitate communication with external devices, such as a computer network or a data storage system. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM), Storage Class Memory (SCM) or any other fast-access memory.

Development application 1332 may comprise program code executed by processor(s) 1310 to cause apparatus 1300 to perform any one or more of the processes described herein. Embodiments are not limited to execution of these processes by a single apparatus.

Scripts 1334 may conform to a backend-executable computing language and may be created by developers via development application 1332. Metadata repository 1336 may comprise an implementation of metadata repository 150 described above. Data 1338 may comprise data store 110, of which a cached portion or full version may be replicated in memory 1360. Data 1338 may therefore include offline scripts automatically generated in an offline-executable language as described above, which are synchronized to offline-enabled clients as also described above.

Data storage device 1330 may also store data and other program code for providing additional functionality and/or which are necessary for operation of apparatus 1300, such as device drivers, operating system files, etc.

Figure 14:
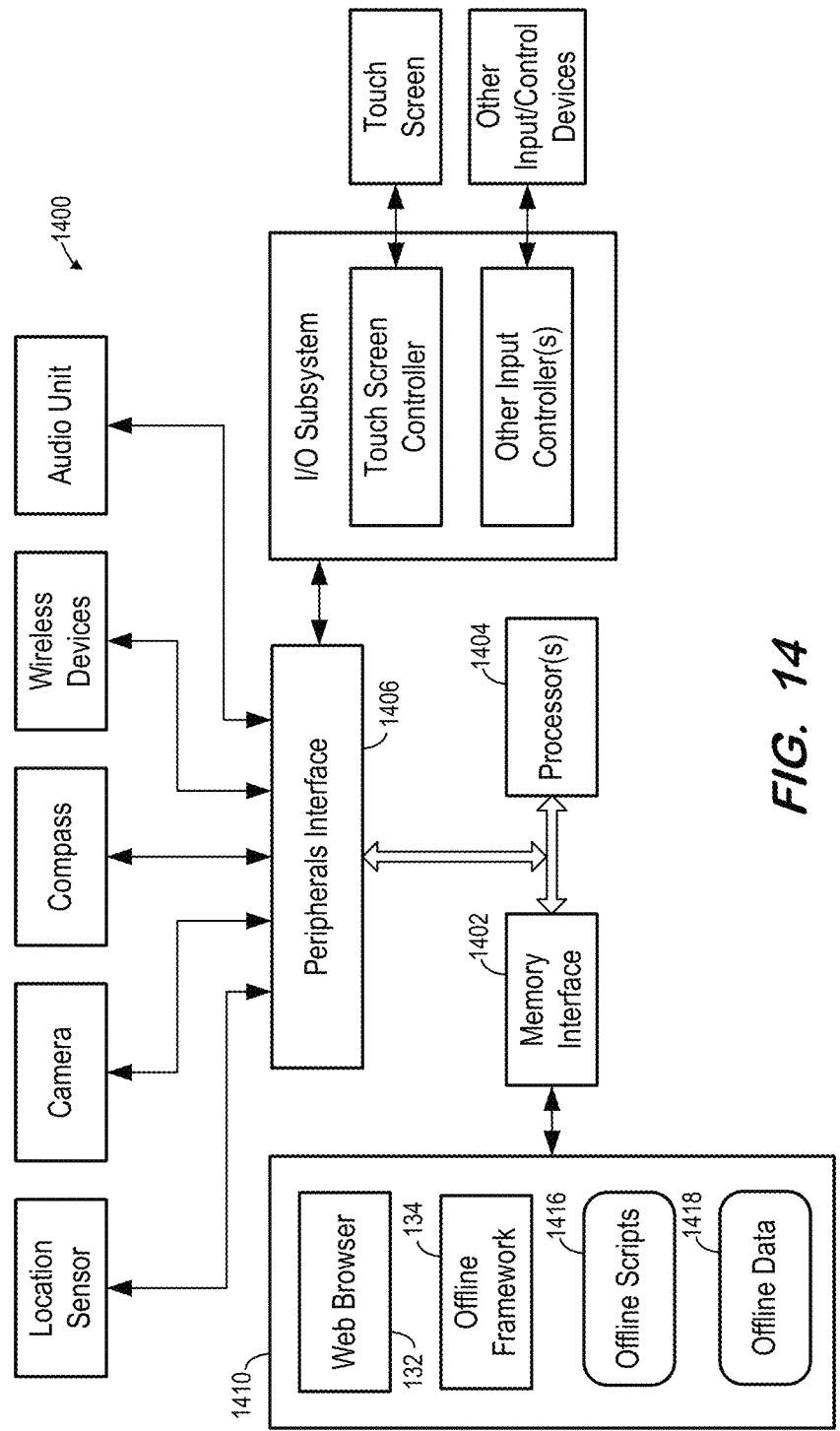
FIG. 14 is a block diagram of a mobile device according to some embodiments.

Apparatus 1400 of FIG. 14 may comprise an implementation of a client 130 according to some embodiments. Apparatus 1400 may therefore perform any of the processes attributed herein to client 130.

Apparatus 1400 may include memory interface 1402, one or more microcontrollers, image processors and/or central processing units 1404, and peripherals interface 1406. Memory interface 1402, one or more processors 1404 and/or peripherals interface 1406 may comprise separate components or can be integrated in one or more integrated circuits. The various components in apparatus 1400 may be coupled to one another by one or more communication buses or signal lines.

Memory interface 1402 is coupled to memory 1410. Memory 1410 may include high-speed random access memory and/or non-volatile memory, such as one or more magnetic disk storage devices, one or more optical storage devices, and/or flash memory (e.g., NAND, NOR). Memory 1410 may store program code of Web browser 132 and offline framework 134, which may be executed by processors 1404 to cause apparatus 1400 to perform the functions described herein. Memory 1410 also stores offline scripts 1416 and offline data 1418 synchronized according to some embodiments as described above.

Memory 1410 may store an operating system. The operating system may include instructions for handling basic system services and for performing hardware dependent tasks. In some embodiments, the operating system can be a kernel (e.g., UNIX kernel). Memory 1410 may also store data, including but not limited to documents, images, video files, audio files, and other data.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computing system comprising:
   a processor configured to:
      receive a server-side script conforming to a backend programming language of an application hosted by a backend server;
      determine the script is intended for offline use;
      identify a declaration of a variable in the server-side script;
      determine a server-side datatype of the variable in the identified declaration, wherein the use of explicit declarations of the datatype are not supported by a client-side scripting language for a mobile device client-side application, wherein the mobile device client-side application is part of a client computing system that is different from the computing system;
      determine a client-side datatype that corresponds to the determined server-side datatype, wherein the determination is based on a comparison of the determined server-side datatype to metadata in a repository indicating client-side datatypes that correspond to server-side datatypes;
      determine an initial value corresponding to the client-side datatype, wherein the initial value is recognizable as an implicit declaration of the server-side datatype to the client-side scripting language; and
      generate an offline script corresponding to the server-side script and conforming to the client-side scripting language, the offline script configured to initialize the variable identified in the server-side script by setting an initial value of the variable to the determined initial value of the client-side datatype that is recognizable as the implicit declaration of the server-side datatype to the client-side scripting language when the client computing system executes the application and the offline script while not connected to the backend server, wherein the generated offline script is not executed by the backend server and the client computing system is different from the computing system;
   a repository configured to store the generated offline script and an indication of a trigger event in association with the offline script; and
   the client computing system including an offline framework processor configured to:
      receive the offline script;
      synchronize the offline script stored in the repository of the computing system with an offline data repository of the client computing system; and execute the offline script within the client computing system.

2. The computing system according to claim 1, wherein the processor is further configured to:
identify a second declaration of a second variable in the server-side script;
determine a second datatype of the second variable based on the second declaration, wherein explicit declarations of the second datatype are not supported by the client-side scripting language;
determine a second initial value of the second datatype that is recognizable as an implicit declaration of the second datatype to the client-side scripting language; and
generate a second portion of the offline script conforming to the client-side scripting language, the second portion of the offline script configured to initialize the second variable by setting an initial value of the second variable to the determined initial value of the second datatype that is recognizable as the implicit declaration of the second data type to the client-side scripting language when the client executes the offline script in the offline state.

3. The client computing system according to claim 1, wherein the offline framework processor is further configured to:
detect an occurrence of the trigger event; and in response to the detected occurrence, execute the offline script.

4. A system according to claim 3, wherein the offline script is received during synchronization of data of the repository with the offline data repository.

5. The computing system according to claim 1, wherein the backend programming language comprises ABAP and the client-side scripting language comprises JavaScript.

6. The computing system of claim 1, wherein the processor is configured to automatically generate the offline script conforming to the client-side scripting language, in response to a modification to the server-side script of the application at the backend server.

7. The computing system of claim 1, wherein the backend server hosts the application, and the generated offline script for the application is configured to be executed locally by a mobile client device when the mobile client devices is not connected to the backend server that hosts the application.

8. A method comprising:
receiving a server-side script conforming to a first backend programming language of an application hosted by a backend server; and
in response to determining offline usage of the server-side script:
identifying a declaration of a variable in the server-side script;
determining a server-side datatype of the variable in the identified declaration, wherein the use of explicit declarations of the datatype are not supported by a client-side scripting language for a mobile device client-side application, wherein the mobile device client-side application is part of a client computing system, wherein the client computing system is different from the backend server;
determining a client-side datatype that corresponds to the determined server-side datatype, wherein the determination is based on a comparison of the determined server-side datatype to metadata in a repository indicating client-side datatypes that correspond to server-side datatypes;
determining an initial value corresponding to the client-side datatype, wherein the initial value is recognizable as an implicit declaration of the server-side datatype to the client-side scripting language; and
generating an offline script corresponding to the server-side script and conforming to the client-side scripting language, the offline script configured to initialize the variable identified in the server-side script by setting an initial value of the variable to the determined initial value of the client-side datatype that is recognizable as the implicit declaration of the server-side datatype to the client-side scripting language when the client system executes the application and the offline script while not connected to the backend server, wherein the generated offline script is not executed by the backend server;
storing the generated offline script and an indication of a trigger event in association with the offline script in a repository associated with the backend server;
receiving the offline script at the client computing system;
synchronizing the offline script stored in the first repository with an offline data repository of the client computing system; and
executing the offline script within the client computing system.

9. A method according to claim 8, further comprising:
identifying a second declaration of a second variable in the server-side script;
determining a second datatype of the second variable based on the second declaration, wherein explicit declarations of the second datatype are not supported by the client-side scripting language;
determining a second initial value of the second datatype that is recognizable as an implicit declaration of the second datatype to the client-side scripting language; and
generating a second portion of the offline script conforming to the client-side scripting language, the second portion of the offline script configured to initialize the second variable by setting an initial value of the second variable to the determined initial value of the second datatype that is recognizable as the implicit declaration of the second data type to the client-side scripting language when the client executes the offline script in the offline state.

10. A method according to claim 8, further comprising:
detecting an occurrence of the trigger event prior to executing the offline script.

11. A method according to claim 8, wherein reception of the offline script comprises synchronization of data of the repository with the client repository.

12. A method according to claim 8, wherein the backend programming language comprises ABAP and the client-side scripting language comprises JavaScript.

13. A method comprising:
receiving a request to generate an offline script for a server-side script written in a backend programming language;
identifying a declaration of a variable in the server-side script which comprises a server-side datatype, wherein the use of declarations for the variable is not explicitly supported in a client-side scripting language for a mobile device client-side application, wherein the mobile device client-side application is part of a client computing system;
determining a client-side datatype that corresponds to the server-side datatype, wherein the determination is based on a comparison of the server-side datatype to metadata in a repository indicating client-side datatypes that correspond to server-side datatypes;

determining an initial value corresponding to the client-side datatype, wherein the initial value is recognizable as an implicit declaration of the server-side datatype to the client-side scripting language;

generating the offline script corresponding to the server-side script, the offline script generated in the client-side scripting language, the offline script implicitly initializing the variable by setting an initial value of the variable to the determined initial value for the client-side datatype that is recognizable as the implicit declaration of the server-side datatype to the client-side scripting language;

storing the generated offline script and an indication of a trigger event in association with the offline script in a storage device;

receiving the offline script at the client computing system;

synchronizing the offline script stored in the storage device with an offline storage device of the second computing system; and executing the offline script within the client computing device in response to activation of the trigger event.

14. The method of claim 13, wherein the variable comprises a string datatype, and the generating comprises implicitly initializing the variable in the string datatype by setting the initial value of the variable to at least one of an empty string and a determined alphanumeric value.

15. The method of claim 13, wherein the variable comprises a numerical datatype, and the generating comprises implicitly initializing the variable in the numerical datatype by setting the initial value of the variable to a determined numerical value.

16. The method of claim 13, wherein the variable comprises a Boolean datatype, and the generating comprises implicitly initializing the variable in the Boolean datatype by setting the initial value of the variable to at least one of a true value and a false value.

* * * * *